(12) United States Patent
Gottlieb et al.

(10) Patent No.: US 7,517,486 B2
(45) Date of Patent: Apr. 14, 2009

(54) PROCESS FOR PREPARING UV CURABLE SEALING ASSEMBLIES

(75) Inventors: Marc Bernard Gottlieb, St. Genis-Pouilly (FR); Christian Ruepping, Corsier/Ge (CH)

(73) Assignee: Du Pont Performance Elastomers L.L.C., Wilmington, DE (US)

( * ) Notice: Subject to any disclaimer, the term of this patent is extended or adjusted under 35 U.S.C. 154(b) by 860 days.

(21) Appl. No.: 10/840,958

(22) Filed: May 7, 2004

(65) Prior Publication Data

US 2004/0239008 A1 Dec. 2, 2004

Related U.S. Application Data

(60) Provisional application No. 60/471,148, filed on May 16, 2003.

(51) Int. Cl.
*B29C 45/72* (2006.01)

(52) U.S. Cl. ............ 264/328.16; 264/496; 264/494; 264/328.1

(58) Field of Classification Search ............ 264/496
See application file for complete search history.

(56) References Cited

U.S. PATENT DOCUMENTS

| | | | |
|---|---|---|---|
| 2,968,649 A | 1/1961 | Pailthorp et al. | |
| 3,051,677 A | 8/1962 | Rexford | |
| 3,682,872 A | 8/1972 | Brizzolara et al. | |
| 3,883,472 A | 5/1975 | Greene et al. | |
| 4,035,565 A | 7/1977 | Apotheker et al. | |
| 4,201,808 A | 5/1980 | Cully et al. | |
| 4,247,510 A * | 1/1981 | Desverchere | 264/236 |
| 4,264,661 A | 4/1981 | Brandolf | |
| 4,281,092 A | 7/1981 | Breazeale | |
| 4,564,662 A | 1/1986 | Albin | |
| 4,694,045 A | 9/1987 | Moore | |
| 4,745,165 A | 5/1988 | Arcella et al. | |
| 4,948,852 A | 8/1990 | Moore | |
| 4,962,236 A | 10/1990 | Tatemoto et al. | |
| 4,973,633 A | 11/1990 | Moore | |
| 4,983,697 A | 1/1991 | Logothetis | |
| 5,272,236 A | 12/1993 | Lai et al. | |
| 5,278,272 A | 1/1994 | Lai et al. | |
| 5,618,488 A | 4/1997 | Tadic et al. | |
| 5,674,959 A | 10/1997 | Arcella et al. | |
| 5,789,509 A | 8/1998 | Schmiegel | |

(Continued)

FOREIGN PATENT DOCUMENTS

CA 2067891 11/1992

(Continued)

OTHER PUBLICATIONS

Bryan G. McClelland, Cure-in Place Gasketing (CIPG) Offers Process and Quality Improvements as a Water Pump Flange Seal, SAE Special Publications, 1997, 47-51, 1235.

(Continued)

*Primary Examiner*—Monica A Huson

(57) ABSTRACT

Processes for preparation of seals and gaskets using cure-in-place techniques that incorporate a molding step, which is preferably an injection molding step, are provided. The processes are useful for preparing sealing assemblies that comprise compositions that are curable by UV radiation and that are adhered to a support member.

6 Claims, 2 Drawing Sheets

U.S. PATENT DOCUMENTS

| | | | |
|---|---|---|---|
| 5,824,755 A | 10/1998 | Hayashi et al. | |
| 5,885,514 A | 3/1999 | Tensor | |
| 6,022,550 A | 2/2000 | Watanabe | |
| 6,346,300 B1 * | 2/2002 | Ruepping | 427/517 |
| 6,472,452 B2 | 10/2002 | Ruepping | |
| 6,495,213 B2 | 12/2002 | Ruepping | |
| 6,503,435 B1 | 1/2003 | Mockenhaupt et al. | |
| 6,506,460 B1 | 1/2003 | Paglia et al. | |

FOREIGN PATENT DOCUMENTS

| | | | |
|---|---|---|---|
| DE | 1130153 B | 5/1962 | |
| JP | 61-31411 | 2/1986 | |
| JP | 62280006 A | 12/1987 | |
| JP | 62280007 A | 12/1987 | |
| JP | 01-318028 | 12/1989 | |
| JP | 20-86680 | 3/1990 | |
| JP | 2003120819 A | 4/2003 | |

OTHER PUBLICATIONS

K. K. Dietliker, Photoinitiators for Free Radical and Cationic Polymerisation, Chemistry & Technology of UV & EB Formulation for Coatings, Inks & Paints, 1991, 204-208, vol. 3, P. K. T. Oldring ed.

Anestis L. Logothetis, Chemistry of Fluorocarbon Elastomers, Prog. Polym. Sci., 1989, 251-296, vol. 14.

Food Contact Notification No. 0017, U.S. Food and Drug Administration, 1999.

UV Light Cures Gasket in 30 Seconds, Machine Design, Jul. 23, 1993, vol. 65, No. 15, Penton, Inc., Cleveland, Ohio, U.S.A.

* cited by examiner

PROCESS FOR PREPARING UV CURABLE SEALING ASSEMBLIES

CROSS-REFERENCE TO RELATED APPLICATIONS

This application claims the benefit of U.S. Provisional Application No. 60/471,148 filed May 16, 2003.

FIELD OF THE INVENTION

The present invention is directed to sealing assemblies of the type that contain bonded seals or gaskets. In particular, the present invention relates to a method for preparation of articles comprising a support and a shaped, adhered, uncured elastomeric sealing composition. In addition, this invention relates to a low temperature method for curing a shaped elastomeric sealing composition adhered to a support to produce a sealing assembly. The invention further relates to articles produced by the processes of the invention.

BACKGROUND OF THE INVENTION

Elastomeric gaskets and seals are generally prepared by processes that are based on compression molding, transfer molding or injection molding techniques wherein a polymer, fully compounded with curing agent and other additives, is introduced into a mold that is then heated under pressure. The elevated temperatures used during the molding process cause chemical reaction of the elastomer with the curative, thereby producing a crosslinked elastomer. As a result of the chemical reactions that occur between the polymer and curative, a network structure is generated throughout the cured, i.e. crosslinked, product. This network structure confers the strength and elasticity that give elastomeric products their characteristic ability to seal under compression.

Normally, elastomeric seals and gaskets produced by any of the molding techniques mentioned above are fitted manually onto an article to be sealed. Alternatively, adhesives are sometimes utilized to attach the cured sealing member to an article. In addition, gaskets may be molded on a metal carrier, for example in the manufacture of shaft seals. Such attachment techniques are not completely satisfactory in all cases. In particular, manual methods are time consuming, adhesives can affect the physical properties of the seal, and molding onto metal carriers requires long cycle times and high temperatures.

Finished seals are often used in grooved articles as sealing means, for example in rocker covers and air intake manifolds that are used in automobile engines, and in bonded door assemblies that are used in electronic and processing equipment. Such grooved parts often have complex cross sections that aid in maintaining the seal in place in the groove during dynamic applications. Production of seals for such grooves involves design of correspondingly complex molds. In addition, insertion of the elastomeric seal into a groove represents a separate, manual step in fabrication of a finished part that can be time-consuming. Alternatives, such as cure in place processes, are not viable in some instances.

Cure in place gasketing techniques that depend on utilization of ultraviolet (UV) radiation, rather than thermally initiated chemistry are known. For example, U.S. Pat. No. 6,346,300; 6,472,452; 6,495,213; and 6,506,460 describe processes that can be used with a variety of elastomers, such as fluoroelastomers, ethylene (meth)acrylate elastomers, ethylene alpha-olefin elastomers, and chlorinated elastomers. The use of silicone elastomers in similar processes is disclosed, for example, in B. G. McClelland, *Cure-In-Place Gasketing Offers Process And Quality Improvements As A Water Pump Flange Seal in Gaskets and Sealants For Automotive Applications*, SAE Special Publications, 1235, 47-51, 1997. Although these processes yield excellent results, in some instances the technique is not appropriate, in particular when high precision and more complex seal shapes are desired than can be achieved when using dispensed cure in place gasketing techniques.

Injection molding, a technique for processing polymers that is noted for production of parts of uniform and complex cross section, is used for thermoplastic compositions because they flow easily on application of heat and do not require a chemical crosslinking process. Injection molding processes are also used for preparation of thermoplastic segmented elastomer compositions wherein a semi-crystalline composition that is shaped in the molding process will maintain its shape after cooling by virtue of crystallization of its hard segments. Such compositions are easily demolded. An example of a process wherein thermoplastic elastomers are employed is disclosed in U.S. Pat. No. 5,618,488 which describes a method of manufacturing a seal for a roller bearing. However, the technique is not economical when used with thermoset elastomers due to the long processing required to crosslink the elastomer and the inevitable non-recyclable scrap that is formed. Another reason that UV cure processes have not generally employed injection molding machines is that most apparatus and molds are not transparent to UV light and therefore a translucent mold is necessary. U.S. Pat. No. 5,885,514 describes a process wherein articles formed from elastomers that are curable by action of UV light are produced in an injection molding machine having a mold that is transparent to UV radiation. This technique is useful, but specialized equipment is necessary.

Because of the uniform mold filling capability of the injection molding process and the benefits associated with manufacture of gaskets using cured in place techniques, it would be useful to have available an injection molding process that can be employed with conventional equipment to produce shaped curable sealing compositions adhered to a support that could be cured in place to produce articles where the physical properties of the cured sealing compositions are typical of crosslinked thermoset elastomers, but wherein the process has a short cycle time and manufacture does not involve production of substantial scrap.

SUMMARY OF THE INVENTION

The present invention is directed to processes for preparing curable sealing compositions on supports, to the articles prepared by such processes, to processes for curing the sealing compositions after application onto the support and to articles having the sealing composition on a support as a component.

In particular, the present invention is directed to a process for providing a UV curable sealing composition on a support, wherein said UV curable sealing composition comprises a substantially uncured elastomer, a multifunctional crosslinking agent and a UV initiator, said process comprising the steps of:

A. providing a first mold plate having at least one injection channel and at least one other mold plate in opposing relation to said first mold plate;

B. providing a support having an optional injection channel;

C. positioning said support between said first mold plate and said at least one other mold plate such that a) said support contacts said first mold plate and said at least one other mold plate and b) a molding cavity is formed comprising said injection channel of said first mold plate and a surface of said support;

D. introducing said UV curable sealing composition into said molding cavity in a manner such that substantially no curing of said UV curable sealing composition takes place and said UV curable sealing composition contacts and adheres to said support; and E. separating said mold plates from said support, leaving said UV curable sealing composition adhered to said support.

The invention is also directed to a curable sealing composition on a support prepared by the above process.

The invention is further directed to a process for preparing a sealing assembly comprising the steps of:

A. providing an assembly wherein at least one component of said assembly comprises a UV curable elastomeric sealing composition adhered to a support, said elastomeric sealing composition comprising a substantially uncured elastomer, a multifunctional crosslinking agent and a UV initiator, wherein said UV curable sealing composition adhered to a support is prepared by a process comprising the steps of:
  1. providing a first mold plate having at least one injection channel and at least one other mold plate in opposing relation to said first mold plate;
  2. providing a support having an optional injection channel;
  3. positioning said support between said first mold plate and said at least one other mold plate such that a) said support contacts said first mold plate and said at least one other mold plate and b) a molding cavity is formed comprising said injection channel of said first mold plate and said support;
  4. introducing said UV curable sealing composition into said molding cavity in a manner such that substantially no curing of said UV curable sealing composition takes place and said UV curable sealing composition contacts and adheres to said support; and
  5. separating said mold plates from said support, leaving said UV curable sealing composition adhered to said support and thereby forming a UV curable elastomeric sealing composition adhered to said support; and B. exposing said assembly to UV radiation for a time sufficient to cure said UV curable elastomeric sealing composition.

In addition, the invention is directed to a sealing assembly prepared by the above process.

DETAILED DESCRIPTION OF THE INVENTION

Figure 1:
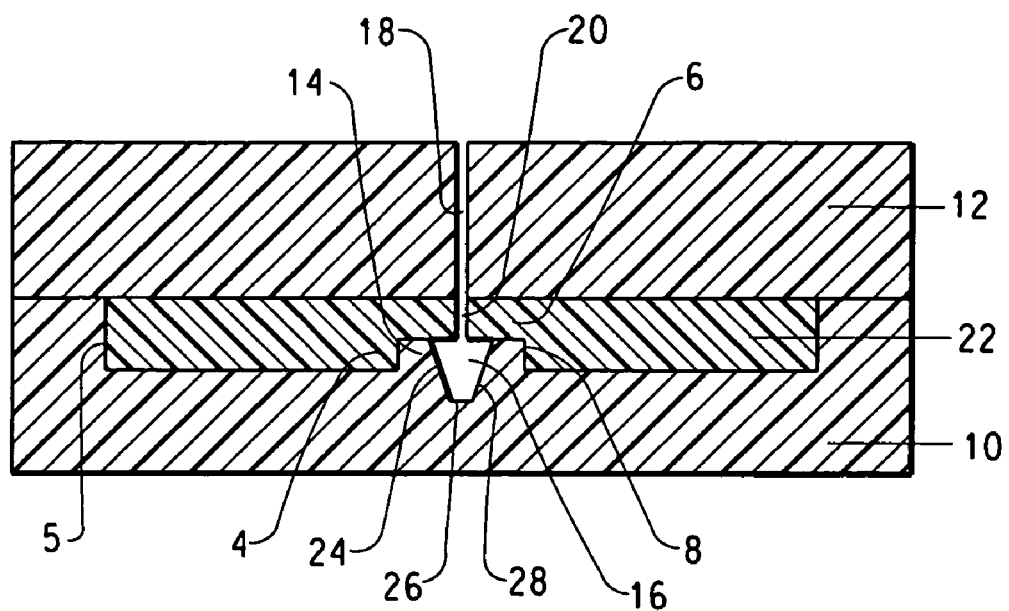
FIG. 1 is a vertical section of an embodiment of a device that allows implementation of a process of the invention wherein support 22 is a grooved support wherein the molding cavity is not contiguous with all surfaces of the groove.

The present invention relates to cured in place seals on supports and in sealing assemblies. Preparation of such sealing assemblies comprises two steps. In a first process, a support, generally, but not necessarily a grooved support, is provided that, with one or more mold plates, forms a mold cavity. A UV curable elastomeric sealing composition is introduced into the mold cavity and maintained therein under conditions where substantially no curing of the UV curable elastomeric sealing composition takes place and the composition will flow into or onto the support. By substantially no curing is meant that the Mooney viscosity ML 1+4 (100° C.), as determined by ASTM D-1646, of the UV curable elastomeric sealing composition remains constant within +/−50% of its initial value before introduction into the mold cavity. The support is then separated from the mold plate or plates, thereby producing a support having a substantially uncured elastomeric composition adhered to the support surface. By substantially uncured is meant that the viscosity of the composition is within +/−50% of the initial value of the composition prior to introduction to the mold cavity. The support, with its associated adhered curable sealing composition, is a useful product that has utility as a component of a sealing assembly. When exposed to UV radiation the curable sealing composition is cured and thereby converted to a seal. The curing operation may be conducted immediately following production of this product. Thus, a support having a cured seal will be produced. Alternatively, the product, in the uncured state, may be utilized as a component in the formation of a sealing assembly. The sealing assembly is prepared by exposing the support and its adhered elastomeric composition, as a component of the assembly, to UV radiation for a time sufficient to cure the sealing composition. The processes result in production of supports and sealing assemblies having well-defined thicknesses of deposited material. The processes also have the advantage of being conducted at relatively low temperature, thereby increasing energy efficiency and permitting in place gasketing of thermoplastic, as well as other substrates, such as ceramics, thermoset substrates such as phenolics or epoxies, or metal substrates. Cycle times in the molding equipment are short, generally less than one minute, and the process is substantially free of scrap.

The UV curable sealing compositions useful in the present invention comprise a substantially uncured elastomer; a multifunctional crosslinking agent, generally an acrylic or methacrylic crosslinking agent or a triallylcyanurate or triallylisocyanurate crosslinking agent; and a UV initiator. By substantially uncured elastomer is meant an elastomer having no crosslinks or a low crosslink density, such that it is extrudable at temperatures up to 250° C. The compositions are curable by the action of UV radiation. These curable compositions are utilized as starting materials in the process for applying a seal to an article that is a further embodiment of the invention. They are thermally stable at temperatures used to process uncured elastomer formulations, e.g. in mixing or extruding operations. Such temperatures generally range from 25° C. to 250° C. By thermally stable is meant that the compositions do not spontaneously form a crosslinked network, i.e. they do not prematurely cure or scorch. That is, the viscosity of the compositions remains constant, within +/−51% of the initial value when heated to the molding temperature and when maintained at that temperature for a period of 5 minutes. The appropriate molding temperature will depend on the decomposition temperature of the particular UV initiator and multifunctional crosslinking agent that is employed. However, the molding temperature must be sufficiently high so that the curable elastomer composition flows to the degree required for the production process. This temperature will generally be from 25° C. to 250° C., preferably from 90° C. to 170° C. The compositions, when heated or subjected to mechanical working, such as in a screw extruder, gear pump, or piston pump, are capable of viscoelastic flow and may be introduced to a mold and formed into curable shaped sealing compositions adhered to a support. These supports with associated curable sealing compositions are articles that may be cured by exposure to UV radiation.

The first component of the thermally stable compositions useful in the processes of the invention is an elastomer, generally an elastomer from the class of thermoset elastomers having a Mooney viscosity of 1-150, ML 1+4 (100° C.), preferably 1-70, ML 1+4 (100° C.). Particularly useful elastomers are members of the following classes of raw (i.e. uncured) elastomeric polymers: ethylene acrylate copolymer rubbers, ethylene methacrylate copolymer rubbers, acrylate rubbers, ethylene vinyl ester elastomers, elastomeric copolymers of a diene and an unsaturated nitrile (i.e., nitrile rubber and hydrogenated nitrile rubber), polyurethane elastomers, silicones, fluoroelastomers having copolymerized units of iodinated, brominated, or chlorinated cure site monomers, fluoroelastomers having copolymerized units of non-conjugated dienes, fluoroelastomers, including those fluoroelastomers having chlorinated, iodinated or brominated comonomers and those having bromine or iodine atoms at terminal positions of the fluoroelastomer, chlorinated olefin elastomers, chlorosulfonated olefin elastomers, and epichlorohydrin elastomers, ethylene alpha-olefin copolymer rubbers, and butyl rubber.

One class of ethylene copolymer rubbers useful in the composition and process of the invention is described in U.S. Pat. No. 6,472,452. This class is made up of two types of ethylene ester copolymers. The first type includes ethylene copolymers having copolymerized units of $C_1$-$C_8$ alkyl esters of acrylic acid or $C_1$-$C_8$ alkyl esters of methacrylic acid. The second type includes ethylene copolymers having copolymerized units of vinyl esters of $C_2$-$C_8$ carboxylic acids. Each of these types of copolymers includes dipolymers or higher order copolymers having copolymerized units of other comonomers.

When the copolymers are dipolymers, the ethylene content ranges from about 20-85 weight percent, preferably 25-65 weight percent. Representative examples of such compositions include copolymers of ethylene with, for example, methyl acrylate, ethyl acrylate, n-butyl acrylate, isobutyl acrylate, 2-ethylhexyl acrylate, hexyl acrylate, and copolymers of ethylene with, for example, vinyl acetate, vinyl propionate, and vinyl hexanoate. Copolymers of ethylene with, for example, methyl methacrylate, ethyl methacrylate, isobutyl methacrylate, 2-ethylhexyl methacrylate, n-butyl methacrylate, or hexyl methacrylate may also be employed, but ethylene acrylate copolymers and ethylene vinyl ester copolymers are preferred. Methyl acrylate, n-butyl acrylate, and vinyl acetate are among the most preferred comonomers. The copolymers generally have Mooney viscosities ranging from 1-60, ML 1+4 (100° C.), preferably 1-20, ML 1+4 (100° C.). Blends of dipolymers may also be utilized.

Examples of higher order types of the foregoing elastomeric copolymers of ethylene which are suitable for use as the polymeric component in the processes of the present invention include copolymers of a) ethylene, b) alkyl acrylates, alkyl methacrylates, or vinyl esters of carboxylic acids, and c) unsaturated acids. Specific examples include terpolymers having copolymerized units of a) ethylene, b) $C_1$-$C_8$ alkyl esters of acrylic acid, $C_1$-$C_8$ alkyl esters of methacrylic acid, or vinyl esters of $C_2$-$C_8$ carboxylic acids and c) carboxylic acids of 3-12 carbon atoms selected from the group consisting of alpha, beta-unsaturated monocarboxylic acids; alpha, beta-unsaturated dicarboxylic acids; and monoesters of alpha, beta-unsaturated dicarboxylic acids. The ethylene content of the copolymers ranges from about 25-70 weight percent of the polymer, preferably 35-65 weight percent, and the alpha, beta-unsaturated mono- or dicarboxylic acids or monoesters of alpha, beta-unsaturated acids are present in an amount sufficient to provide 0.1-10 weight percent, preferably 0.5-5.0 weight percent, of carboxylic acid groups. Suitable alpha, beta-unsaturated mono-or dicarboxylic acids include monocarboxylic acids such as acrylic acid and methacrylic acid; dicarboxylic acids, such as maleic acid, fumaric acid, and itaconic acid; and monoesters of dicarboxylic acids such as ethyl hydrogen maleate, ethyl hydrogen fumarate, and 2-ethylhexyl hydrogen maleate. Acrylic acid, methacrylic acid, and ethyl hydrogen maleate are preferred. The alkyl acrylate or the vinyl ester comonomers comprise 25-70 weight percent of the polymer, preferably 30-65 weight percent. Alkyl acrylates suitable for use in the polymers include $C_1$-$C_8$ alkyl esters of acrylic acid, for example, the methyl, ethyl, n-butyl, isobutyl, hexyl, and 2-ethylhexyl esters. Methyl, ethyl, and butyl acrylates are preferred. Methyl acrylate is most preferred. Vinyl esters of carboxylic acids suitable for use in the polymers include vinyl esters of carboxylic acids having 2-8 carbon atoms, for example, vinyl acetate, vinyl propionate, vinyl hexanoate, and vinyl 2-ethylhexanoate. Vinyl acetate is preferred. Mooney viscosities, ML 1+4 (100° C.), of these copolymers generally range from 1-50, preferably 1-20. Representative examples of such copolymers include terpolymers and tetrapolymers such as ethylene/methyl acrylate/methacrylic acid copolymers; ethylene/methyl acrylate/ethyl hydrogen maleate copolymers; ethylene/acrylic acid/vinyl acetate copolymers; ethylene/butyl acrylate/acrylic acid copolymers; ethylene/vinyl acetate/methacrylic acid copolymers; ethylene/fumaric acid/methyl acrylate copolymers; ethylene/methyl acrylate/carbon monoxide/methacrylic acid copolymers; and ethylene/ethyl hydrogen maleate/carbon monoxide/vinyl acetate copolymers. Copolymer blends or blends of copolymers and other polymers may also be utilized.

In addition, copolymers contemplated by the invention are those in which the ethylene (meth)acrylate ester copolymer backbone has been modified by grafting with agents such as photosensitive groups. Some examples of such compositions are described in K. K. Dietliker, *Photoinitiators for Free Radical and Cationic Polymerization*, in Chemistry & Technology of UV & EB Formulation for Coatings, Inks & Paints, Vol. 3, 204-208 (P. K. T. Oldring ed., 1991).

Another polymer type in this class of elastomeric ethylene copolymers suitable for use in the practice of the invention contains copolymerized units of ethylene, an acrylic ester or vinyl ester, glycidyl acrylate or methacrylate, and optionally, carbon monoxide. Generally, such compositions contain from 30-70 weight percent ethylene, 25-65 weight percent acrylic or vinyl ester, 2-10 weight percent glycidyl acrylate or methacrylate, and 0-15 weight percent carbon monoxide, the weight percentages adding up to 100 weight percent. Copolymers of ethylene, acrylate ester, and glycidyl methacrylate are preferred. Representative alkyl acrylates and alkyl acrylates that are used as comonomers include methyl acrylate, ethyl acrylate, propyl acrylate, n-butyl acrylate, isobutyl acrylate, and hexyl acrylate. Representative copolymers include ethylene/methyl acrylate/glycidyl methacrylate; ethylene/n-butyl acrylate/glycidyl methacrylate; ethylene/vinyl acetate/ glycidyl methacrylate; and ethylene/methyl acrylate/carbon monoxide/glycidyl methacrylate.

A further polymer type in this class of elastomeric ethylene copolymers suitable for use in the practice of the invention contains copolymerized units of a) ethylene; b) vinyl acetate, a $C_1$-$C_8$ alkyl acrylate or a $C_1$-$C_8$ alkyl methacrylate; and c) carbon monoxide or sulfur dioxide. The vinyl acetate, alkyl acrylate or alkyl methacrylate content of the copolymer is generally 20-50 weight percent and the carbon monoxide or sulfur dioxide content is generally 5-40 weight percent. Examples of such copolymers include ethylene/vinyl acetate/carbon monoxide; ethylene/n-butyl acrylate/carbon monoxide; ethylene/methyl acrylate/carbon monoxide; and ethylene/ethyl hydrogen maleate/carbon monoxide/vinyl acetate.

Both the dipolymers and higher copolymers described above are generally prepared by continuous copolymerization of ethylene and the comonomers in a stirred reactor in the presence of at least one free radical initiator at temperatures of from about 100° C. to 300° C. and at pressures of from about 130 to 350 MPa, generally as described in U.S. Pat. No. 3,883,472. Most preferably the copolymers are also prepared in the presence of about 2-25 weight percent methanol or acetone so that reactor fouling is decreased or eliminated.

The elastomeric component may also be selected from the class of acrylate rubbers comprising homopolymers or copolymers of $C_1$-$C_{10}$ alkyl acrylates. Preferred alkyl acrylates include ethyl acrylate, butyl acrylate, and 2-ethylhexyl acrylate. Copolymers of acrylate rubbers contain copolymerized units of up to 40 weight percent monovinyl monomers, for example, styrene, acrylonitrile, vinylbutyl ether, acrylic acid, and $C_1$-$C_{10}$ alkyl acrylates different from the principal alkyl acrylate comonomer. Such copolymers are available commercially, for example, Hytemp® acrylate rubbers (acrylic homopolymer and copolymer rubbers available from Nippon Zeon, KK), and Toacron® AR-601 acrylate rubbers (polyethylacrylate polymers, available from Toa Paint, KK.).

Further, the elastomeric component may be a copolymer of a diene and an unsaturated nitrile. The diene may be, for example, butadiene. The nitrile is preferably acrylonitrile. Such copolymers are known as nitrile rubbers and are commercially available. They generally have acrylonitrile contents of 18-50 wt. %. Hydrogenated nitrile rubbers are also suitable for use in the processes of the invention.

Fluoroelastomers suitable for use as the elastomeric component in the processes of the invention include fluoroelastomers comprising copolymerized units of one or more monomers containing fluorine, such as vinylidene fluoride, hexafluoropropylene, 1-hydropentafluoropropylene, 2-hydropentafluoropropylene, tetrafluoroethylene, chlorotrifluoroethylene, and perfluoro(alkyl vinyl) ether, as well as other monomers not containing fluorine, such as ethylene, and propylene. Elastomers of this type are described in Logothetis, *Chemistry of Fluorocarbon Elastomers*, Prog. Polym. Sci., Vol. 14, 251-296 (1989). The polymers may be prepared by polymerization of the appropriate monomer mixtures with the aid of a free radical generating initiator either in bulk, in solution in an inert solvent, in aqueous emulsion or in aqueous suspension. The polymerizations may be carried out in continuous, batch, or in semi-batch processes. General preparative processes are disclosed in the Logothetis article and in U.S. Pat. Nos. 4,281,092; 3,682,872; 4,035,565; 5,824,755; 5,789,509; 3,051,677; and 2,968,649.

Specific examples of such fluoroelastomers include copolymers of vinylidene fluoride and hexafluoropropylene and, optionally, tetrafluoroethylene; copolymers of vinylidene fluoride and chlorotrifluoroethylene; copolymers of vinylidene fluoride, hexafluoropropylene, tetrafluoroethylene and chlorotrifluoroethylene; copolymers of tetrafluoroethylene and propylene; and copolymers of tetrafluoroethylene and perfluoro(alkyl vinyl) ether, preferably perfluoro (methyl vinyl) ether. Each of the fluoroelastomers of the composition of the invention also comprises at least one halogenated cure site or a reactive double bond resulting from the presence of a copolymerized unit of a non-conjugated diene. The halogenated cure sites may be copolymerized cure site monomers or halogen atoms that are present at terminal positions of the fluoroelastomer polymer chain. The cure site monomers, reactive double bonds or halogenated end groups are capable of reacting to form crosslinks. The cure site monomers are selected from the group consisting of brominated, chlorinated, and iodinated olefins; brominated, chlorinated, and iodinated unsaturated ethers and non-conjugated dienes. The brominated cure site monomers may contain other halogens, preferably fluorine. Examples are bromotrifluoroethylene, 4-bromo-3,3,4,4-tetrafluorobutene-1 and others such as vinyl bromide, 1-bromo-2,2-difluoroethylene, perfluoroallyl bromide, 4-bromo-1,1,2-trifluorobutene, 4-bromo-1,1,3,3,4,4, -hexafluorobutene, 4-bromo-3-chloro-1,1,3,4,4-pentafluorobutene, 6-bromo-5,5,6,6-tetrafluorohexene, 4-bromoperfluorobutene-1 and 3,3-difluoroallyl bromide. Brominated unsaturated ether cure site monomers useful in the invention include ethers such as 2-bromo-perfluoroethyl perfluorovinyl ether and fluorinated compounds of the class $CF_2Br$—$R_f$—O—$CF$=$CF_2$, such as $CF_2BrCF_2O$—$CF$=$CF_2$, and fluorovinyl ethers of the class $ROCF$=$CFBr$ or $ROCBr$=$CF_2$, where R is a lower alkyl group or fluoroalkyl group, such as $CH_3OCF$=$CFBr$ or $CF_3CH_2 OCF$=$CFBr$. Iodinated olefins may also be used as cure site monomers. Suitable iodinated monomers include iodinated olefins of the formula: $CHR$=$CH$—$Z$—$CH_2CHR$—I, wherein R is —H or —$CH_3$; Z is a $C_1$-$C_{18}$ (per)fluoroalkylene radical, linear or branched, optionally containing one or more ether oxygen atoms, or a (per)fluoropolyoxyalkylene radical as disclosed in U.S. Pat. No. 5,674,959. Other examples of useful iodinated cure site monomers are unsaturated ethers of the formula: $I(CH_2CF_2CF_2)_n OCF$=$CF_2$ and $ICH_2CF_2O[CF(CF_3)CF_2O]_nCF$=$CF_2$, and the like, wherein n=1-3, such as disclosed in U.S. Pat. No. 5,717,036. In addition, suitable iodinated cure site monomers including iodoethylene, 4-iodo-3,3,4,4-tetrafluorobutene-1; 3-chloro-4-iodo-3,4,4-trifluorobutene; 2-iodo-1,1,2,2-tetrafluoro-1-(vinyloxy)ethane; 2-iodo-1-(perfluorovinyloxy)-1,1,-2,2-tetrafluoroethylene; 1,1,2,3,3,3-hexafluoro-2-iodo-1-(perfluorovinyloxy)propane; 2-iodoethyl vinyl ether; 3,3,4,5,5,5-hexafluoro-4-iodopentene; and iodotrifluoroethylene, are disclosed in U.S. Pat. No. 4,694,045.

Examples of non-conjugated diene cure site monomers include 1,4-pentadiene, 1,5-hexadiene, 1,7-octadiene and others, such as those disclosed in Canadian Patent 2,067,891. A suitable triene is 8-methyl-4-ethylidene-1,7-octadiene. Of the cure site monomers listed above, preferred compounds include 4-bromo-3,3,4,4-tetrafluorobutene-1;4-iodo-3,3,4,4-tetrafluorobutene-1; and bromotrifluoroethylene.

Additionally, or alternatively, iodine, bromine or mixtures thereof may be present at the fluoroelastomer chain ends as a result of the use of chain transfer or molecular weight regulating agents during preparation of the fluoroelastomers. Such agents include iodine-containing compounds that result in bound iodine at one or both ends of the polymer molecules. Methylene iodide; 1,4-diiodoperfluoro-n-butane; and 1,6-diiodo-3,3,4,4,tetrafluorohexane are representative of such agents. Other iodinated chain transfer agents include 1,3-diiodoperfluoropropane; 1,4-diiodoperfluorobutane; 1,6-diiodoperfluorohexane; 1,3-diiodo-2-chloroperfluoropropane;

1,2-di(iododifluoromethyl)-perfluorocyclobutane; monoiodoperfluoroethane; monoiodoperfluorobutane; 2-iodo-1-hydroperfluoroethane; etc. Particularly preferred are diiodinated chain transfer agents. Examples of brominated chain transfer agents include 1-bromo-2-iodoperfluoroethane; 1-bromo-3-iodoperfluoropropane; 1-iodo-2-bromo-1,1-difluoroethane and others such as disclosed in U.S. Pat. No. 5,151,492.

Copolymers of ethylene, tetrafluoroethylene, perfluoro (alkyl vinyl) ether and a bromine-containing cure site monomer, such as those disclosed by Moore, in U.S. Pat. No. 4,694,045 are suitable for use in the present invention. Copolymers of tetrafluoroethylene and perfluoro(alkyl vinyl) ether commonly containing fluorinated nitrile cure sites, for example perfluoro(8-cyano-5-methyl-3,6-dioxa-1-octene) and others disclosed in U.S. Pat. No. 4,983,697, may also be used. Other useful fluoroelastomers containing brominated or iodinated olefin cure site monomers are described in U.S. Pat. Nos. 4,035,565; 4,564,662; 4,745,165; 4,694,045; 4,948,852; and 4,973,633. Other iodinated cure site monomers are disclosed in U.S. Food and Drug Administration, Food Contact Notification No. 0017 (1999), and U.S. Pat. No. 4,962,236.

Each of these classes of copolymers includes dipolymers or higher order copolymers having copolymerized units of other comonomers.

It has been found that raw fluoroelastomers having Mooney viscosities in the range of 5-150, ML 1+4 (121° C.), preferably 10-70, ML 1+4 (121° C.), are particularly useful in the processes of the present invention. Those compositions wherein the fluoroelastomer has a Mooney viscosity within the preferred range exhibit an optimum balance of processability and tensile properties.

It has also been found that compositions containing fluoroelastomers having levels of copolymerized cure site monomer units within the range of 0.05-10.0 wt. % exhibit enhanced cure state.

Chlorinated olefin polymers are also suitable for use as the elastomeric component of the processes of the invention. The chlorinated olefin polymers also specifically include chlorosulfonated olefin polymers. By olefin polymers is meant homopolymers and copolymers of $C_2$-$C_8$ alpha-monoolefins, including graft copolymers. The copolymers may be dipolymers or higher order copolymers, such as terpolymers or tetrapolymers. The olefin polymers may be branched or unbranched and may be prepared by free radical processes, Ziegler-Natta catalysis or catalysis with metallocene catalyst systems, for example those disclosed in U.S. Pat. Nos. 5,272,236 and 5,278,272. Particularly useful examples of olefin polymers include homopolymers of $C_2$-$C_3$ alpha monoolefins, copolymers of ethylene and carbon monoxide, and copolymers of ethylene and at least one ethylenically unsaturated monomer selected from the group consisting of $C_3$-$C_{20}$ alpha monoolefins, $C_1$-$C_{12}$ alkyl esters of unsaturated $C_3$-$C_{20}$ monocarboxylic acids, unsaturated $C_3$-$C_{20}$ mono- or dicarboxylic acids, anhydrides of unsaturated $C_4$-$C_8$ dicarboxylic acids, and vinyl esters of saturated $C_2$-$C_{18}$ carboxylic acids. Specific examples of these polymers include polyethylene, polypropylene, ethylene vinyl acetate copolymers, ethylene acrylic acid copolymers, ethylene methacrylic acid copolymers, ethylene methyl acrylate copolymers, ethylene methyl methacrylate copolymers, ethylene n-butyl methacrylate copolymers, ethylene glycidyl methacrylate copolymers, graft copolymers of ethylene and maleic anhydride, graft copolymers of propylene and maleic anhydride, and copolymers of ethylene with propylene, butene, 3-methyl-1-pentene, hexene, or octene. Preferred olefin polymers are polyethylene, ethylene propylene copolymers, ethylene butene copolymers, ethylene octene copolymers, copolymers of ethylene and acrylic acid, copolymers of ethylene and methacrylic acid, and copolymers of ethylene and vinyl acetate. The olefin polymers have number average molecular weights within the range of 1,000 to 300,000, preferably from 50,000 to 300,000. The chlorinated and chlorosulfonated olefin polymers have chlorine contents of from about 15 weight percent to about 70 weight percent. The chlorosulfonated olefin polymers have sulfur contents of 0.5-10 weight percent, preferably 1-3 weight percent.

The chlorinated or chlorosulfonated olefin polymers may be prepared from the olefin polymers by free radical initiated chlorination and chlorosulfonation. Chlorination of the olefin polymers may take place at temperatures of 50° C.-150° C. and at pressures of 1-10 atmospheres using gaseous chlorine as the chlorinating agent. In solution chlorination, the reaction medium is an inert solvent, for example carbon tetrachloride, chlorinated benzene, chloroform or fluorobenzene. Alternatively, slurry chlorination in aqueous or organic suspension can be used. Fluidized bed processes are also known, as well as melt processes. Chlorosulfonation of the olefin polymer starting materials may take place in solution, under similar conditions, utilizing gaseous chlorine and sulfur dioxide, sulfuryl chloride, or a combination of chlorine, sulfur dioxide and sulfuryl chloride. Commercially available chlorinated and chlorosulfonated olefin polymers include Tyrin® chlorinated polyethylene, Hypalon® chlorosulfonated polyethylene, and Acsium® chlorosulfonated polyethylene, all available from DuPont Dow Elastomers L.L.C.

Epichlorohydrin elastomers that are suitable for use as the elastomeric component in the processes of the invention include both polyepichlorohydrin homopolymers and copolymers comprising copolymerized units of epichlorohydrin and ethylene oxide. Terpolymers containing cure site monomers, such as allyl glycidyl ether, may also be used. Such compositions generally contain about 20-45 wt. % chlorine. Commercially available examples include Epichlomer® rubber manufactured by Daiso Epichlo Rubber Co., Ltd., Japan and Hydrin® epichlorohydrin rubber manufactured by Nippon Zeon Co., Ltd., Japan.

In addition, ethylene alpha-olefin elastomers, such as elastomeric copolymers and interpolymers of ethylene with one or more comonomers selected from propylene, 1-butene, 1-hexene, 1-octene, 4-methyl-1-pentene, and other $C_3$-$C_{20}$ alpha-olefins, are suitable elastomeric components in the UV curable composition. Elastomeric copolymers of ethylene, a $C_3$-$C_8$ olefin, and a diene may also be used in the processes of the invention. These copolymers can be terpolymers, tetrapolymers or higher order copolymer elastomers of the ethylene/$C_3$-$C_8$ alpha olefin/diene type. These elastomers are copolymers of ethylene, a $C_3$-$C_8$ alpha-olefin and at least one non-conjugated diene. They may, in addition, contain a minor amount, generally up to 10 weight percent, of at least one other diene or triene having copolymerizable double bonds. Preferred $C_3$-$C_8$ alpha-olefins are propylene and butene. The non-conjugated dienes of the first type include 1,4-hexadiene; 2-methyl-1,5-hexadiene; vinyl norbornene; 8-methyl-4-ethylidene-1,7-octadiene; 1,9-octadecadiene; dicyclopentadiene; tricyclopentadiene; 5-ethylidene-2-norbornene; or 5-methylene-2-norbornene. Preferred dienes having one reactive double bond are 1,4-hexadiene, dicyclopentadiene and ethylidene norbornene. The non-conjugated dienes of the second type include norbornadiene; 1,4-pentadiene; 1,5-hexadiene; 1,7-octadiene; 1,2-heneicosadiene; or 5-(5-hexenyl)-2-norbornene, preferably norbornadiene. These polymers are generally produced by polymerization in the presence of Ziegler-Natta catalysts or by polymerization in the presence of metallocene catalysts. Preparative techniques for ethylene alpha-olefin elastomers prepared in the presence of metallocene catalysts may be found in U.S. Pat. Nos. 5,278,272 and 5,272,236. Typical ethylene alpha-olefin copolymers and EPDM elastomers are commercially available as Engage® polyolefin elastomers and Nordel® hydrocarbon rubbers from DuPont Dow Elastomers L.L.C.

Ultraviolet-curable polyurethane rubbers are known, for example see Japanese Published Patent Application 02-86680, and Japanese Published Patent Application 01-318028. Polyurethane rubbers such as these or others of the appropriate Mooney viscosity, are suitable for use in the present invention.

Silicone elastomers may also be cured in the presence of polyfunctional acrylates or dimethacrylates and a UV initiator, as disclosed in U.S. Pat. No. 4,201,808. Such silicone elastomers or others, of the appropriate Mooney viscosity, are also suitable for use in the present invention.

The elastomeric component of the compositions useful in the invention may be a blend of elastomers as well as a single elastomer. The blends may be mixtures of polymers of the same class, for example, a brominated fluoroelastomer and an iodinated fluoroelastomer, or they may be mixtures of more than one type of elastomer, for example a chlorinated polyolefin rubber and an ethylene copolymer rubber. Blends wherein only one elastomer is capable of cure by exposure to UV radiation are also contemplated by the invention. Blend compositions would be particularly useful for balancing physical properties. For example, it would be desirable to balance state of cure with fuel resistance by blending fluoroelastomers with epichlorohydrin rubbers. In other circumstances, blends of costly polymers with less expensive polymers often yield a combination of properties that are adequate for less demanding applications. In this context, blends of fluoroelastomers and nitrile rubber or fluoroelastomers and ethylene acrylate copolymer elastomers would be suitable for use as the elastomeric component in the processes of the invention. The Mooney viscosities of the blends will preferably be within the range of 1-150, ML 1+4 (100° C.), because within this range the blends will be suitable for use in the processes of the present invention for producing general rubber articles, such as seals. The blend compositions will preferably be clear, but may be translucent for most effective cure.

In addition to an elastomeric component, the curable compositions useful in the invention also include at least one multifunctional crosslinking agent. Preferably the multifunctional crosslinking agent will be an acrylic or methacrylic crosslinking agent. In addition, it may be a multifunctional cyanurate or multifunctional isocyanurate, such as triallyl isocyanurate, trimethylallylisocyanurate, triallyl cyanurate or trimethylallylisocyanurate. Depending on the elastomer, the multifunctional crosslinking agent may be a polyol. By multifunctional acrylic or methacrylic crosslinking agent is meant an ester that is a reaction product of a polyhydroxylic compound, generally a polyhydroxylic alcohol, and acrylic acid or methacrylic acid, wherein the crosslinking agent has at least two carbon-carbon double bonds. Such compositions are commonly referred to in the art as multifunctional acrylates or multifunctional methacrylates. Typical multifunctional acrylates and methacrylates have molecular weights of 150 to 1,000 and contain at least two polymerizable unsaturated groups per molecule.

Representative multifunctional acrylic crosslinking agents include acrylates and methacrylates such as ethylene glycol diacrylate; ethylene glycol dimethacrylate; 1,6-hexanediol diacrylate; 1,6-hexanediol dimethacrylate; 1,4-butanediol diacrylate; pentaerythritol triacrylate; pentaerythritol tetraacrylate; dipentaerythritol pentaacrylate, methoxy-1,6hexanediolpentaerythritol triacrylate; trimethylolpropane triacrylate; tetraethylene glycol diacrylate; polymethacrylate urethanes; epoxy acrylates; polyester acrylate monomers and oligomers; trimethylolpropane propoxylate triacrylate; poly-n-butyleneoxide glycol diacrylates; and bisphenol A alkylene oxide adduct diacrylates. Trimethylolpropane triacrylate and trimethylolpropane trimethacrylate are preferred crosslinking agents because these compounds are readily available. In addition, compression set and crosslink density are enhanced in compositions containing these crosslinking agents compared to compositions containing difunctional acrylates, such as diethylene glycol dimethacrylate.

The multifunctional acrylic and methacrylic crosslinking agents are capable of homopolymerization when irradiated. Thus, when curable compositions containing multifunctional acrylates or methacrylates are used in the processes of the invention and the compositions are exposed to UV radiation, two reactions occur simultaneously. The multifunctional crosslinking agent reacts with the elastomeric polymer component to form interchain and intrachain crosslinks, resulting in a rubber matrix. In addition, excess multifunctional crosslinking agent will homopolymerize and form an interpenetrating network which acts to reinforce the rubber matrix, much in the same manner as fillers reinforce elastomers. It is therefore possible to control the hardness of the final cured product by adjusting the proportion of multifunctional crosslinker present in the curable composition. In general, difunctional acrylates and methacrylates are less efficient crosslinking agents compared to their analogues having higher functionalities. Consequently, crosslinking agents of the class having higher functionalities are preferred for purposes of the present invention.

Elastomeric materials compounded and cured according to methods commonly used in rubber processing technology generally contain carbon black or fillers, generally for reinforcement, but sometimes for enhancement of other properties. Reinforcement is reflected in properties such as hardness, modulus, and tensile strength. Generally, reinforced elastomers are characterized by non-linear stress/strain dependence. In contrast, non-reinforced elastomer compositions are characterized by an initial stress build-up at low deformation which does not substantially increase at higher deformation. Further, non-reinforced elastomer compositions tend to break at relatively low ultimate tensile strength.

Use of fillers in UV-initiated reactions would normally be expected to interfere with the UV curing process. However, the present process permits curing of translucent compositions. Thus, the compositions used in the processes of the present invention may contain a limited amount of fillers, generally no more than 15 parts by weight per 100 parts polymer. Reinforcement is effected simultaneously with crosslinking by formation of an interpenetrating network. The resultant product exhibits stress/strain behavior that is more linear than that of traditional elastomers which contain fillers which are not chemically bound to the elastomer matrix.

The amount of multifunctional crosslinking agent present in the compositions used in the processes of the invention will depend on the particular elastomer used. Generally, the amount ranges from 0.5 to 25 weight percent, based on the combined weight of polymer, multifunctional crosslinking agent, and UV initiator.

The third component of the curable compositions useful in the invention is a UV initiator. It may be selected from those organic chemical compounds conventionally employed to promote UV-initiated formation of radicals either by intramolecular homolytic bond cleavage or by intermolecular hydrogen abstraction. Such agents include organic compounds having aryl carbonyl or tertiary amino groups. Among the compounds suitable for use are benzophenone; acetophenone; benzil; benzaldehyde; o-chlorobenzaldehyde; xanthone; thioxanthone; 9,10-anthraquinone; 1-hydroxycyclohexyl phenyl ketone; 2,2-diethoxyacetophenone; dimethoxyphenylacetophenone; methyl diethanolamine; dimethylaminobenzoate; 2-hydroxy-2-methyl-1-phenylpropane-1-one; 2,2-di-sec-butoxyacetophenone; 2,2-dimethoxy-1,2-diphenylethan-1-one; benzil dimethoxyketal; benzoin methyl ether; and phenyl glyoxal. Upon exposure to UV radiation, a variety of photochemical transformations may occur, for example, the UV initiator may form free radical reactive fragments that react with the acrylate end groups of the multifunctional acrylic or methacrylic crosslinking agent. This initiates crosslinking of the polymer as well as homopolymerization of the acrylic or methacrylic crosslinking agent. A preferred UV initiator is 1-hydroxycyclohexyl phenyl ketone because of the rapidity with which it generates free radicals when exposed to UV radiation. Mixtures of UV initiators may also be used. This is often desirable because it provides more efficient production of radicals in certain cases. In general, the UV initiator will be present in an amount of 0.1 to 10.0 weight percent, based on the total weight of polymer, multifunctional crosslinking agent, and UV initiator. However, it is preferable to use between 0.5-2.5 weight percent UV initiator, most preferably 0.5-1.0 weight percent UV initiator, based on total weight of polymer, crosslinking agent and UV initiator, because high levels of photoinitiator tend to interfere with penetration and do not substantially contribute to the overall crosslink density. Within the ranges disclosed herein, there is an optimum level of photoinitiator for each particular combination of uncured gum elastomer and crosslinking agent. These optimum levels can be readily determined by one skilled in the art. For example, hydrogenated nitrile rubber will generally require a higher level of photoinitiator than a copolymer of ethylene, methyl acrylate, and ethyl hydrogen maleate. Higher levels of photoinitiator increase the crosslink density at the surface of the cured composition. Low levels of photoinitiators can result in better (i.e. lower) compression sets of samples that are several millimeters thick.

In addition, for purposes of the present invention, the temperature of molding must not exceed the temperature at which thermal degradation or deactivation of the UV initiator occurs. In some cases such degradation would result in scorchy compositions due to formation of free radicals. This is so because thermally-induced fragmentation of the initiator within the processing equipment results in premature crosslinking of the elastomer. In other instances, slow curing compositions would result due to inactivation of the initiator. Degradation temperatures will differ for each particular UV initiator. Depending upon the type of rubber and the amount of additives, the molding temperature will range from between 25° C. and 250° C. Elastomeric compositions suitable for use in the invention are those that are stable and can be applied to a substrate at temperatures of up to 250° C. A further practical limitation on the molding temperature is that the temperature must not exceed the softening point of the substrate to which the elastomeric compositions are to be applied.

Preferably, the elastomeric component, multifunctional crosslinking agent component, and UV initiator component are present in the compositions used in the processes of the present invention in specific relative ratios, but those skilled in the art will will recognize that the particular ratio of elastomeric component, crosslinking agent and UV initiator that is effective will vary depending on the particular elastomer, crosslinking agent and UV initiator selected.

For example, when the elastomeric component of the composition is an ethylene copolymer elastomer, an acrylate rubber or a nitrile rubber, the UV curable sealing composition preferably comprises 75-95 weight percent elastomer, based on the total weight of elastomer, crosslinking agent, and UV initiator. The multifunctional crosslinking agent preferably is present in an amount of 2 to 24 weight percent, based on the total weight of elastomer, crosslinking agent, and UV initiator. Finally, the UV initiator is preferably present in an amount of 0.2 to 5.0 weight percent based on the total weight of elastomer, crosslinking agent, and UV initiator. Most preferably, the elastomeric component will be present in an amount of from 87-95 weight percent, based on the total weight of elastomer, crosslinking agent, and UV initiator. The level of crosslinker determines compression set resistance and hardness in the curable composition of the invention. If less than 2 weight percent crosslinker is present, a composition having low hardness and poor compression set resistance may be formed. Greater than 30 weight percent crosslinker results in production of a composition of hardness greater than 70 Shore A. Such compositions are generally unsuitable for use in sealing, especially gasketing, applications. The particular component range selected will thus depend on the specific end use contemplated. Preferred compositions contain 5-20 weight percent multifunctional crosslinking agent, and most preferred compositions contain 5-15 weight percent multifunctional crosslinking agent, based on the combined weight of polymer, multifunctional crosslinking agent and UV initiator. When the elastomeric component of the composition is a fluoroelastomer, the elastomer is preferably present in an amount of 70-99 weight percent, based on the total weight of elastomer, crosslinking agent, and UV initiator. The multifunctional crosslinking agent is preferably present in an amount of 0.5-20 weight percent, based on the total weight of elastomer, crosslinking agent, and UV initiator. Finally, the UV initiator is preferably present in an amount of 0.1-10 weight percent based on the total weight of elastomer, crosslinking agent, and UV initiator. Most preferably, the elastomeric component will be present in an amount of from 75-95 weight percent, based on the total weight of elastomer, crosslinking agent, and UV initiator. The level of crosslinker determines compression set resistance and hardness in the curable composition of the invention. Preferably the multifunctional crosslinker is present in an amount of 4-15 weight percent based on the weight of elastomer, crosslinker and UV initiator. The particular component range selected will depend on the specific end use contemplated. When chlorinated olefin polymers, chlorosulfonated olefin polymers or epichlorohydrin rubbers are used as the elastomeric component of the composition, the elastomer is preferably present in an amount of 80-97 weight percent, based on the total weight of elastomer, crosslinking agent, and UV initiator. The multifunctional crosslinking agent is preferably present in an amount of 2-19.5 weight percent, based on the total weight of elastomer, crosslinking agent, and UV initiator. The UV initiator is preferably present in an amount of 0.2-5.0 weight percent based on the total weight of elastomer, crosslinking agent, and UV initiator. Most preferably, the elastomeric component will be present in an amount of from 85-95 weight percent, based on the total weight of elastomer, crosslinking agent, and UV initiator. Preferably, the crosslinker will be present in an amount of 3-15 weight percent, based on the total weight of elastomer, crosslinking agent and UV initiator. As with the other compositions useful in the processes of the invention, the particular component range selected will depend on the specific end use contemplated.

Various additives, commonly used in rubber compounding, may be incorporated into the compositions useful in the present invention to modify, stabilize, and reinforce these compositions. Preferably, such additives will be used in amounts which do not interfere substantially with the crosslinking reaction of the uncured polymeric component. For example, if large amounts of fillers that are opaque to UV light are utilized, the filled compositions will not cure evenly throughout, or only the surface of the composition will be cured. Usually, fillers may be employed in amounts of up to about 15 parts per hundred parts of elastomer. Typical examples include non-black fillers such as minerals or glass fibers.

Polymeric fillers of high reinforcing efficiency, such as polytetrafluoroethylene and aramid fibers, may also be used, generally at low levels. It is preferable that the presence of additives does not raise the viscosity of the curable composition used in the process of the invention to more than ML 1+4 (100° C.) of 150 or lower it to less than ML 1+4 (100° C.) of 1. Compositions outside this range are not suitable for the gasketing in place process of the invention. In addition to other additives, the elastomeric sealing compositions may contain plasticizers and process aids that may generally be added at levels up to about 15 to 20 parts per hundred parts elastomer.

When the polymeric component is a fluoroelastomer, preferred curable compositions useful in the present invention will include 0.01-2.0 parts by weight per hundred parts by weight fluoroelastomer of an organotin hydride. Preferably 0.1-1 parts by weight of the organotin hydride will be used per 100 parts by weight fluoroelastomer. Tri-n-butyltin hydride is preferred.

When ethylene acrylate copolymers are utilized as the polymeric component, heat and oxidation resistance of the compositions useful in the invention are preferably enhanced by incorporation of antioxidants. Generally, aromatic antioxidants are utilized, especially aromatic amines. Due to their protective action, these compounds interfere to a certain extent with the free radical crosslinking reaction initiated by UV radiation. In the absence of antioxidants, the compositions are subject to surface cracking when exposed to temperatures of 150° C. for periods of several days. Among the most useful antioxidants are 4,4'-bis($\alpha$,$\alpha$-dimethylbenzyl)diphenylamine and blends of 4,4'-bis($\alpha$,$\alpha$-dimethylbenzyl)diphenylamine with 4-($\alpha$-dimethylbenzyl)diphenylamine. Hindered phenols may be employed, but they interfere more with the curing reaction than do the aromatic amines. Antioxidants are usually incorporated at a level of between 0.5-2 parts per 100 parts polymer. Other additives may also be incorporated into the compositions useful in the invention, for example plasticizers, adhesion promoters, flame retardants, and process aids commonly used in rubber compounding.

Small amounts of inhibitors may also be present in the compositions useful in the invention as a result of the presence of these additives in commercial samples of acrylic or methacrylic crosslinking agents. The inhibitors are generally present in low amounts, for example below 1500 ppm (parts per million, based on the weight of the crosslinking agent). They act to prevent thermally induced polymerization of the crosslinking agents during storage and shipment.

The processes of the invention are particularly suited for manufacture of elastomeric seals and gaskets using a technique we refer to herein as cure in place. Generally, according to this technique, a curable elastomeric composition is heated to a temperature of up to 250° C., preferably 90° C.-170° C. The composition is then introduced into a molding cavity having at least one surface comprising the substrate to which the seal is to be adhered to form an uncured seal of a desired thickness on the substrate. The substrate having the uncured seal composition is subsequently exposed to UV radiation, resulting in cure of the seal composition. Thus, the seal is formed in place directly on the object to be sealed. Typically, uncured seals are formed in thicknesses of up to about 20 mm, generally 6-10 mm and preferably in thicknesses of 0.5-6 mm.

In one embodiment of the process of the present invention, a curable composition comprising a low viscosity elastomer component, multifunctional crosslinking agent, and UV initiator, is introduced to an injection molding machine. The composition, when heated, becomes soft and extrudable. The curable composition is introduced into a mold cavity formed in part by a support onto which the curable composition is to be deposited and at least one mold plate of the injection molding machine. For example, the curable composition may be introduced to the injection molding machine by an extruder, a piston pump, a heated drum or any other feeding device. The curable composition may be pre-mixed before introduction to the feeding device. For example, the pre-mixed composition may be in the form of strips that are fed to a feeding device. Alternatively, separate components may be added to the feeding device, thus permitting mixing and feeding to be accomplished in one piece of equipment, for example in an extruder or series of extruders. In this way, the composition can be applied with precise control onto a support or introduced into a groove or other cavity formed by one or more surfaces of the support. The support may be a material such as a metal, thermoplastic, glass, or ceramic article or to a fabric or film. When the cure in place technique of the invention is used to form a gasket, the curable sealing composition, in the shape of a gasket will remain as an uncured bead, e.g. in a groove of the support. The support having an adhered UV curable sealing composition is separated from the mold plate or plates. The support with its adhered sealing composition may immediately be exposed to UV radiation for a time sufficient to cure the sealing composition, thus forming one type of sealing assembly. Although the conditions for UV cure will vary depending upon the thickness of and size of the adhered sealing composition, the polymer selected and the type and ratio of multifunctional crosslinking agent and UV initiator, generally cures of 2 seconds -1.5 minutes with a UV radiation source (400-250 nm) of 200 W/cm are sufficient to effect cure. Under commercial conditions, cure will generally take place by passing the UV-curable composition, adhered to the support, on a conveyer past a UV source. Alternatively, the support may be stored, protected from UV radiation, and exposed to UV radiation at a later time for purposes of curing the elastomeric sealing composition. In addition, the support with its adhered uncured sealing composition may be used as a component in a larger assembly. That is, it may be combined with other components to form an article, i.e. an assembly, that is exposed to UV radiation thereby causing cure of the elastomeric composition in the assembly to form a sealing assembly.

Those skilled in the art will recognize that the appropriate temperature for metering and molding will be dependent on the viscosity of the uncured elastomer, the molecular weight of the uncured elastomer, the level of crosslinking agent, the decomposition temperature of the photoinitiator and the volatilization temperature of the crosslinking agent and will select a value within the range up to 250° C. that is optimum for the particular circumstances.

Other embodiments of the process of the present invention include co-injection molding wherein the support onto which the composition is adhered is formed of a thermoplastic material in a first injection molding process step. The thus-formed substrate is then positioned to receive the UV curable composition according to the process of the present invention. Other embodiments include compression molding and transfer molding.

The gasketing process of the present invention may be employed for manufacture of seals and gaskets using curable elastomer compositions.

In order to optimize the elastomeric properties of seals made by the above-described processes, the sealing composition must be crosslinked, i.e. cured. It would be impractical to utilize a heat-activated cure system to accomplish a rapid crosslinking reaction in such processes. One would risk converting the curable composition used to form the seals to an intractable, prematurely crosslinked material during the feeding and molding step. Specifically, as the curable composition was heated or subjected to temperature elevation caused by mechanical working, the crosslinking reaction would be triggered. It would be difficult to control premature gelling (i.e. scorch) during introduction to the mold and molding. Because crosslinked compositions do not flow readily, processes which result in scorchy products are undesirable. Consequently, cure systems which rely on thermally-induced crosslinking reactions are not appropriate for the present process. In addition, the most common homolytic, i.e. free radical, curing processes, which depend only on thermal decomposition of peroxides, are also unsuitable for use in the present process. The curable compositions are effectively cured by UV radiation induced free radical processes.

UV cure of the sealing composition using the process of the invention may be accomplished at room temperature or at higher temperatures. For example, in many circumstances it may be desirable to perform a photocure immediately after application of the uncured composition to the object to be sealed to avoid excess flow. At that point, the temperature of the composition may be as high as 250° C. However, heating the curable composition is neither necessary nor particularly desirable for an effective photocure. In addition, when the compositions are used to form seals on thermoplastic articles, low temperature cure minimizes any possibility of degradation or thermal distortion of the thermoplastic. Further, even though it may be optimal, it is not necessary to perform the UV irradiation in an inert atmosphere. The cure reaction can be conducted under atmospheric conditions with no deleterious effects. In addition, it has also been found that in some cases, particularly when curing chlorinated or chlorosulfonated polyolefins, underwater curing is preferable because heat buildup is minimized. This reduces the tendency of these polymers to dehydrochlorinate, a process which causes polymer degradation and discoloration.

For purposes of the process of this invention, the wavelength spectrum of radiation used to effect the curing reaction typically corresponds to the absorption maximum of the UV initiator. This typically ranges from about 200-400 nanometers. Suitable UV radiation sources include medium pressure mercury vapor lamps, electrodeless lamps, pulsed xenon lamps, and hybrid xenon/mercury vapor lamps. A preferred arrangement comprises one or more lamps together with a reflector, which diffuses the radiation evenly over the surface to be irradiated. The radiation dosage must be sufficient to cure the polymeric composition, i.e. to produce a cured composition having a compression set of 90 or lower, preferably 50 or lower, and an elongation at break of at least 100%. A dosage of at least about 10 joules per square centimeter, and preferably 20 joules is usually sufficient for optimum cure. Dosage is a function of the time of exposure to the UV radiation, the distance from the UV radiation source and the power level of the radiation source. The required radiation dose can be readily determined by curing small samples of the curable composition and measuring physical properties, such as tensile strength, compression set and elongation, after cure. In most instances, an acceptable degree of cure can be obtained by exposures of 30-300 seconds using a lamp of about 80 W/cm. A 200 W/cm lamp has been found to be especially efficient. Appropriate adjustments may be made depending on the power of the lamp, distribution of the output over the UV range, the thickness of the sample as well as the polymeric component, level of crosslinking agent present, and level of filler present. For example, ethylene acrylate copolymer rubber containing filler would require a longer cure time than the same composition without filler.

Foaming agents may be incorporated into the curable compositions useful in the present invention. In such circumstances a cellular structure will be formed by exposure of the curable composition to UV radiation as a result of thermal decomposition of the foaming agent induced by simultaneous heating that occurs during exposure to UV light. This heating phenomenon may be augmented and controlled by additional external application of heat. Typical foaming agents that may be employed include p,p'-oxybisbenzenesulfonyl hydrazide, azodicarbonamides, p-toluenesulfonyl semicarbazides, and dinitrosopentamethylene tetramine. Alternatively, the UV curing reaction may also be accomplished with cooling, so that curing and foaming occur sequentially, rather than simultaneously. That is, the curable composition is exposed to UV radiation with cooling, and the cured composition is then passed through a hot air tunnel to cause foaming. Closed cell structures of low specific gravity may be prepared by such processes. For example, structures with specific gravities of 0.20-0.60 g/cm$^3$ may be obtained.

The invention is further described by reference to the drawings. Referring to FIG. 1, a support 22, having an injection channel 20, is placed on second mold plate 10, having cavity 16 with sides 24 and 28 and base 26. Support 22 has a groove 14 having a base 6 and sidewalls 4 and 8. First mold plate 12, having injection channel 18, is positioned on the upper surface of support 22 so that the lower face of first plate 12 contacts the upper face of support 22. Cavity 16 and injection channels 18 and 20 may each be of any desired shape. First mold plate 12 is placed in contact with support 22 so that channel 18 contacts and is contiguous with injection channel 20, thereby providing a passage for supplying a UV curable elastomeric sealing composition, specifically a composition comprising an uncured elastomer, a multifunctional crosslinking agent and a UV initiator, to cavity 16. Thus, a molding cavity is formed defined by injection channel 18, injection channel 20 and cavity 16. A curable elastomeric composition is introduced into cavity 16 through injection channels 18 and 20 under conditions such that substantially no cure of the UV curable elastomeric sealing composition occurs, i.e. under conditions such that the viscosity of the composition remains constant, within +/−50% of its initial value when heated to the molding temperature. Second mold plate 10 and first mold plate 12 are then removed from contact with support 22 to produce a support having an adhered curable elastomeric composition of precise shape. The support with adhered elastomeric composition may be exposed to UV radiation immediately, it may be stored in the uncured state, or it may be formed into an assembly in combination with other components, after which the assembly may be exposed to UV radiation. Temperature of the first or second mold plates may be varied or controlled by passing heating or cooling media through channels (not shown) in either or both of the mold plates. Recess 5 of second mold plate 10 is an optional feature.

In other embodiments (not shown) the first mold plate, the support and the second mold plate may each have a multiplicity of injection channels. Further, the support may contact and be positioned between more than one mold plate or mold plates.

Figure 2:
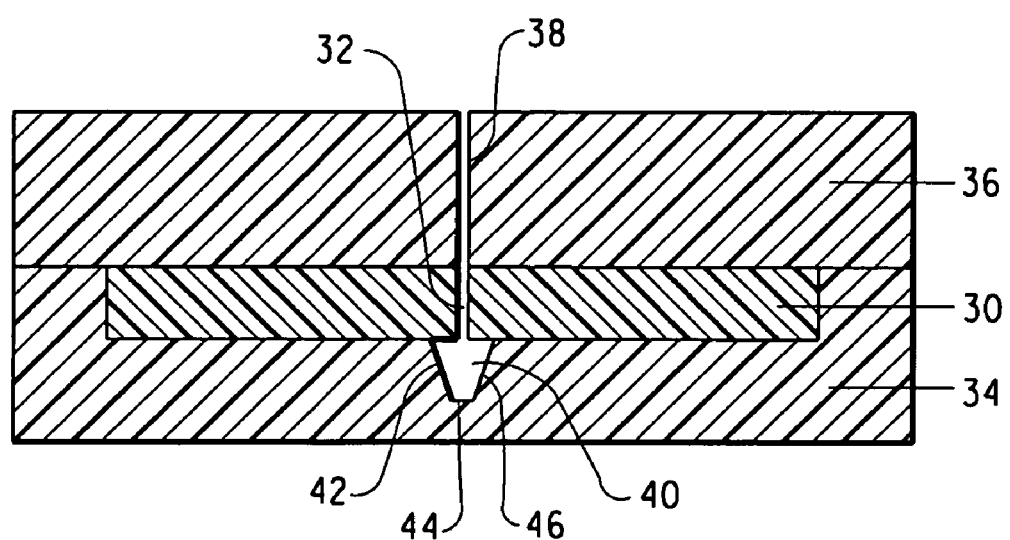
FIG. 2 is a vertical section of an embodiment of a device that allows implementation of a process of the invention wherein support 30 does not contain a groove.

A further embodiment of the invention is illustrated by reference to FIG. 2. A support 30, having injection channel 32, is placed on second mold plate 34 having cavity 40 with sides 42 and 46 and base 44. First mold plate 36, having injection channel 38, is positioned on the upper surface of support 30 so that the lower face of first mold plate 36 contacts the upper face of support 30. Cavity 40 and injection channels 32 and 38 may each be of any desired shape. First mold plate 36 is placed in contact with support 30 so that injection channel 38 contacts and is contiguous with injection channel 32, thereby providing a passage for supplying a UV curable elastomeric sealing composition, specifically a composition comprising an uncured elastomer, a multifunctional crosslinking agent and a UV initiator. Second mold plate 34 is placed in contact with support 30 so that the passage formed by injection channels 32 and 38 is contiguous with cavity 40. Thus, a molding cavity is formed defined by injection channels 32 and 38 and cavity 40. A curable elastomeric composition is introduced into cavity 40 through injection channels 32 and 38 under conditions such that substantially no cure of the UV-curable elastomeric sealing composition occurs, i.e. the viscosity of the composition remains constant, within +/−50% of the initial value when heated to the molding temperature. Second mold plate 34 and first mold plate 36 are then removed from contact with support 30 to produce a support having an adhered curable elastomeric composition of precise shape.

Figure 3:
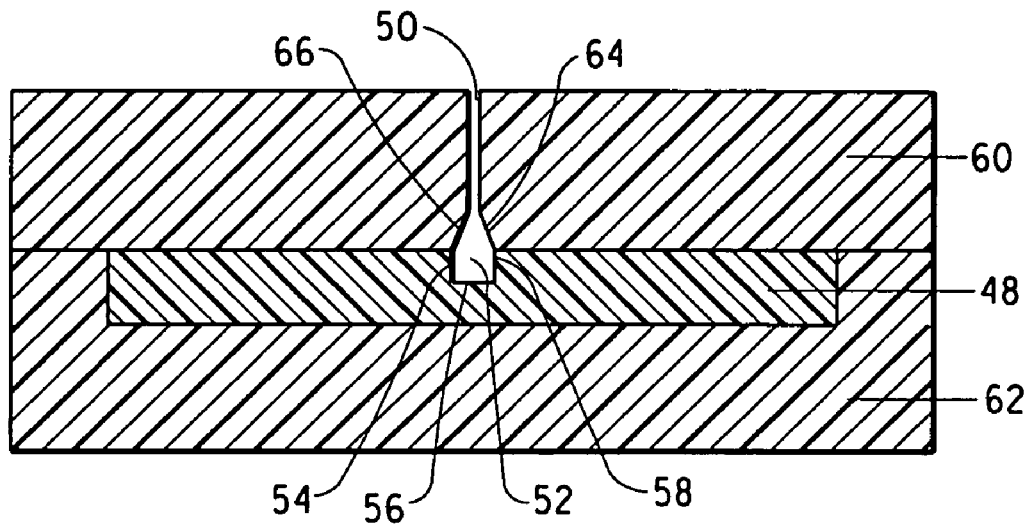
FIG. 3 is a vertical section of an embodiment of a device that allows implementation of a process of the invention wherein support 48 is a grooved support wherein the molding cavity is contiguous with all surfaces of the groove.

Referring to FIG. 3, a support 48, having surfaces 54, 56, and 58, is placed on second mold plate 62. First mold plate 60, having injection channel 50, is positioned on the upper surface of support 48 so that the lower face of first plate 60 contacts the upper face of support 48. A mold cavity is formed from cavity 52 defined by surfaces 54, 56, and 58 of support 48 and surfaces 64 and 66 of first mold plate 60; and injection channel 50. Cavity 52 and injection channel 50 may each be of any desired shape. A UV curable elastomeric sealing composition, specifically a composition comprising an uncured elastomer, a multifunctional crosslinking agent and a UV initiator is then introduced to cavity 52 via injection channel 50 under conditions such that substantially no cure of the UV curable elastomeric sealing composition occurs, i.e. under conditions such that the viscosity of the composition remains constant, within +/−50% of its initial value when heated to the molding temperature. Second mold plate 62 and first mold plate 60 are then removed from contact with support 48 to produce a support having an adhered curable elastomeric composition of precise shape. Temperature of the first or second mold plates may be varied or controlled by passing heating or cooling media through channels (not shown) in either or both of the mold plates.

Figure 4:
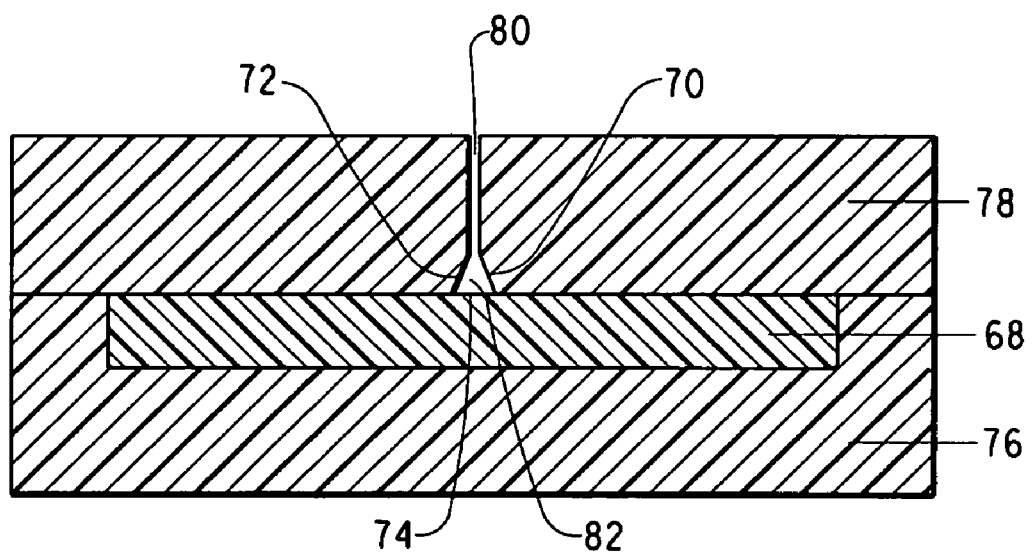
FIG. 4 is a vertical section of an embodiment of a device that allows implementation of a process of the invention wherein support 68 does not contain a groove.

Referring to FIG. 4, support 68 is placed on second mold plate 76. First mold plate 78 is positioned on the upper surface of support 68 so that the lower face of first plate 78 contacts the upper face of support 68. A mold cavity is formed from cavity 82, having sides 70 and 72 and base 74, and injection channel 80. Cavity 82 and injection channel 80 may each be of any desired shape. A UV curable elastomeric sealing composition, specifically a composition comprising an uncured elastomer, a multifunctional crosslinking agent and a UV initiator is then introduced to cavity 82 via injection channel 80 under conditions such that substantially no cure of the UV curable elastomeric sealing composition occurs, i.e. under conditions such that the viscosity of the composition remains constant, within +/−50% of its initial value when heated to the molding temperature. Second mold plate 76 and first mold plate 78 are then removed from contact with support 68 to produce a support having an adhered curable elastomeric composition of precise shape. Temperature of the first or second mold plates may be varied or controlled by passing heating or cooling media through channels (not shown) in either or both of the mold plates.

The mold plates may be made from any of a variety of materials, but are generally metal. The support may also comprise a variety of materials, such as thermoplastic materials, ceramics, thermoset materials such as phenolics or epoxies, fabrics, or metals.

In another embodiment, more than one upper or lower mold plate may be utilized, for example where a main injection channel has branches, each of which feeds into a separate set of mold plates and supports.

In further embodiments of the invention, surfaces of the support that form a part of the molding cavity may be pre-treated with a coating that will increase adhesion of the uncured elastomer composition to the surface of the support. Such coatings are commonly used as adhesives. Depending upon the support material and the UV-curable composition the coating may be selected from a range of silane-based species of proprietary composition, for example Chemlock® rubber bonding agents available from Lord Corporation, Cilbond® polymer bonding systems, available from Chemical Innovations Ltd. and Thixon® adhesives and Megum® adhesives, available from Rohm & Haas Corporation and Chemosil® adhesives, available from Henkel KGaA. In addition, primers activated by UV light are suitable, such as D-Ply-5-2 primer, available from Dongsung NSC and 9078X primer available from H. P. Fuller, Inc. In further embodiments of the invention sides 24 and 28 and base 26 of cavity 16 of FIG. 1 and second mold plate 10 may be pre-treated with a coating that will decrease the adhesion of the uncured elastomer composition to the surface of the mold, permitting easier demolding of the support with its adhered uncured elastomer composition. Such coatings include agents that act as a lubricant at the surface of the mold or sacrificial mold release agents that may be applied by spraying, wiping or brushing onto the surface, for example polydimethylsiloxanes. Alternatively, crosslinkable polymers for example polysiloxanes or fluoropolymers that are applied from solution or emulsion, such as various grades of TraSyS™ mold release systems from E. I. Du Pont de Nemours and Co., are suitable. These release agents of the latter type consist of a volatile carrier and crosslinkable polymer. They require a short curing time, during which the carrier evaporates and the polymer binds to the mold and crosslinks to form a thick uniform release film. In addition, special metallic alloys, polytetrafluoroethylene or alloys of metals with polytetrafluoroethylene may be applied directly to the mold surface.

For easy removal, it is preferable to cool the second mold plate prior to removal of the curable compositions adhered to the support. This may be accomplished by allowing a period of time following introduction of the curable composition to the molding cavity or cooling may be accomplished, for example, by passing fluids through channels in the mold plate. Other methods of cooling will be familiar to those skilled in the art.

The supports with curable sealing compositions of the present invention are useful in manufacture of articles containing bonded in place seals and gaskets, for example in liquid crystal display panels. The cured sealing assemblies of the present invention are useful as automotive parts having gaskets of complex shape, such as rocker covers, transmission covers, oil pans, water pumps, air intake manifolds, radiators, head lamps and engine flanges for rotary shaft seals. Complex shaped gaskets are also used in applications such as fuel cell plates and stacks.

What is claimed is:

1. A process for providing a thermally stable, curable sealing composition on a support, wherein said thermally stable, curable sealing composition is curable by exposure to ultraviolet radiation, said process comprising the steps of:
   A. providing a first mold plate having at least one injection channel and at least one other mold plate in opposing relation to said first mold plate;
   B. providing a support having an optional injection channel;
   C. positioning said support between said first mold plate and said at least one other mold plate such that a) said support contacts said first mold plate and said at least one other mold plate and b) a molding cavity is formed comprising said injection channel of said first mold plate and a surface of said support;
   D. providing a thermally stable, curable sealing composition comprising a substantially uncured elastomer, a multifunctional crossliniking agent and an ultraviolet radiation initiator, free of a heat activated cure system;
   E. heating said thermally stable, curable sealing composition to a temperature of 90° C.-250° C. and introducing said heated thermally stable, curable sealing composition into said molding cavity in a manner such that substantially no curing of said thermally stable, curable sealing composition takes place;
   F. maintaining said heated thermally stable, curable sealing composition at a temperature of 90° C.-250° C. for a time sufficient for said thermally stable, curable sealing composition to be molded without crossliniking said sealing composition; and
   G. separating said mold plates from said support, leaving said curable sealing composition adhered to said support.

2. A process of claim 1 wherein said support has an injection channel, said injection channel being contiguous with at least one injection channel of said first mold plate, thereby forming a molding cavity comprising said injection channel of said first mold plate, said injection channel of said support, and a surface of the at least one other mold plate.

3. The process of claim 1 wherein the molding cavity is pre-treated with a mold release agent that will decrease adhesion of the thermally stable, uncured elastomer composition to the surface of the mold.

4. A process for preparing a sealing assembly comprising the steps of
   A. providing an assembly wherein at least one component of said assembly comprises a thermally stable, curable elastomeric sealing composition adhered to a support, wherein said thermally stable, curable elastomeric sealing composition is curable by exposure to ultraviolet radiation and wherein said thermally stable, curable sealing composition adhered to a support is prepared by a process comprising the steps of:
      1. providing a first mold plate having at least one injection channel and at least one other mold plate in opposing relation to said first mold plate;
      2. providing a support having an optional injection channel;
      3. positioning said support between said first mold plate and said at least one other mold plate such that a) said support contacts said first mold plate and said at least one other mold plate and b) a molding cavity is formed comprising said injection channel of said first mold plate and said support;
      4. providing a thermally stable, curable sealing composition comprising a substantially uncured elastomer, a multifunctional crossliniking agent and an ultraviolet radiation initiator
      5. heating said thermally stable, curable sealing composition to a temperature of 90° C.-250° C. and introducing said heated thermally stable curable sealing composition into said molding cavity in a manner such that substantially no curing of said curable sealing composition takes place and
      6. maintaining said heated thermally stable, curable sealing composition at a temperature of 90° C.-250° C. for a time sufficient for said thermally stable, curable sealing composition to be molded without crossliniking said sealing composition; and
      7. separating said mold plates from said support, leaving said thermally stable, curable sealing composition adhered to said support, thereby forming a thermally stable, curable elastomeric sealing composition adhered to said support; and
   B. exposing said assembly to ultraviolet radiation for a time sufficient to cure said thermally stable, curable elastomeric sealing composition.

5. A process of claim 4 wherein said support has an injection channel, said injection channel being contiguous with at least one injection channel of said first mold plate, thereby forming a molding cavity comprising said injection channel of said first mold plate, said injection channel of said support, and the at least one other mold plate.

6. The process of claim 4 wherein the molding cavity is pre-treated with a mold release agent that will decrease adhesion of the thermally stable, uncured elastomer composition to the surface of the mold.

* * * * *